United States Patent
Nakai et al.

(10) Patent No.: US 12,503,577 B2
(45) Date of Patent: Dec. 23, 2025

(54) POLYROTAXANE, POLYMER COMPOSITION, CROSSLINKED POLYMER COMPOSITION, AND PRODUCTION METHOD THEREFOR

(71) Applicants: TOYODA GOSEI CO., LTD., Kiyosu (JP); THE UNIVERSITY OF TOKYO, Tokyo (JP)

(72) Inventors: Takanori Nakai, Kiyosu (JP); Naoki Iwase, Kiyosu (JP); Naoyuki Akahori, Kiyosu (JP); Hideyuki Imai, Kiyosu (JP); Hidekazu Kurimoto, Kiyosu (JP); Makoto Ishida, Kiyosu (JP); Kohzo Ito, Tokyo (JP); Rina Maeda, Tokyo (JP); Shota Ando, Tokyo (JP); Katsunari Inoue, Kashiwashi (JP)

(73) Assignees: TOYODA GOSEI CO., LTD., Aichi-pref. (JP); THE UNIVERSITY OF TOKYO, Tokyo (JP)

( * ) Notice: Subject to any disclaimer, the term of this patent is extended or adjusted under 35 U.S.C. 154(b) by 695 days.

(21) Appl. No.: 17/796,216

(22) PCT Filed: Dec. 2, 2020

(86) PCT No.: PCT/JP2020/044782
§ 371 (c)(1),
(2) Date: Jul. 28, 2022

(87) PCT Pub. No.: WO2021/161626
PCT Pub. Date: Aug. 19, 2021

(65) Prior Publication Data
US 2023/0123626 A1    Apr. 20, 2023

(30) Foreign Application Priority Data
Feb. 12, 2020    (JP) .................. 2020-021219

(51) Int. Cl.
*C08L 5/16*    (2006.01)

(52) U.S. Cl.
CPC .................. *C08L 5/16* (2013.01)

(58) Field of Classification Search
CPC ......... C08L 5/16; C08L 71/02; C08J 2300/10; C08J 2300/26; C08J 2400/21; C08J 3/246; C08B 37/0015; C08G 83/007
See application file for complete search history.

(56) References Cited

U.S. PATENT DOCUMENTS

| | | | | |
|---|---|---|---|---|
| 6,972,309 B1 * | 12/2005 | Wideman | ............... | C08C 19/25 524/506 |
| 2008/0097039 A1 * | 4/2008 | Ito | ............... | C08G 83/00 525/50 |
| 2009/0312490 A1 | 12/2009 | Ito et al. | | |

FOREIGN PATENT DOCUMENTS

| JP | 2006-233007 A | 9/2006 |
|---|---|---|
| JP | 2015-203037 A | 11/2015 |

(Continued)

OTHER PUBLICATIONS

Sasabe, H et al., "Efficient synthesis of [2]- and higher order rotaxanes via the transition metal-catalyzed hydrosilylation of alkyne", Tetrahedron Letters, Apr. 11, 2005, vol. 46, Issue. 22, p. 3851-3853 (cited in the PCT Search Report).

(Continued)

*Primary Examiner* — Doris L Lee
(74) *Attorney, Agent, or Firm* — Posz Law Group, PLC

(57) ABSTRACT

The present invention provides a crosslinked polymer composition exhibiting significantly improved elongation at break over conventional ones, and a polymer composition and a polyrotaxane, each of which can be used as a raw material of the crosslinked polymer composition.
The polyrotaxane contains a linear molecule, a cyclic molecule, and a blocking group, wherein the cyclic molecule has (Continued)

a hydrosilyl group. The polymer composition contains the polyrotaxane and a polymer, wherein the polymer has a double bond on at least either a main chain or a side chain. The crosslinked polymer composition is produced by crosslinking of the polymer composition through chemical reaction between the hydrosilyl group of the cyclic molecule and the double bond of the polymer.

5 Claims, 5 Drawing Sheets

(56) References Cited

FOREIGN PATENT DOCUMENTS

| | | |
|---|---|---|
| JP | 2018-024768 A | 2/2018 |
| WO | 2005/080469 A1 | 9/2005 |

OTHER PUBLICATIONS

International Search Report of the International Searching Authority mailed Feb. 22, 2021 for the corresponding International application No. PCT/JP2020/044782 (and English translation).

International Preliminary Report on Patentability of the International Searching Authority mailed Aug. 25, 2022 for the corresponding international application No. PCT/JP2020/044782 (and English translation).

* cited by examiner

F I G. 1
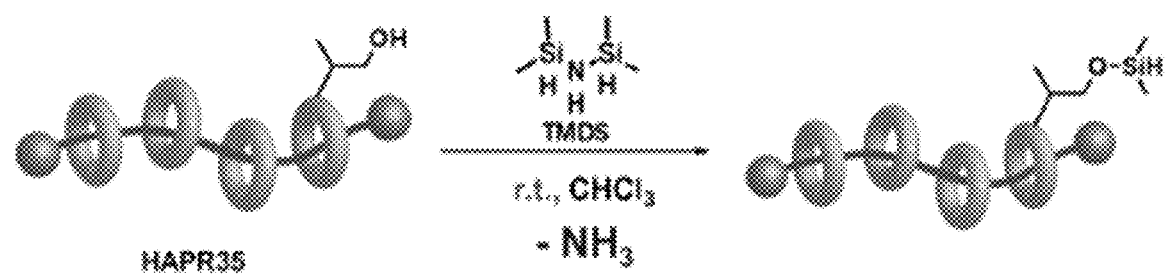

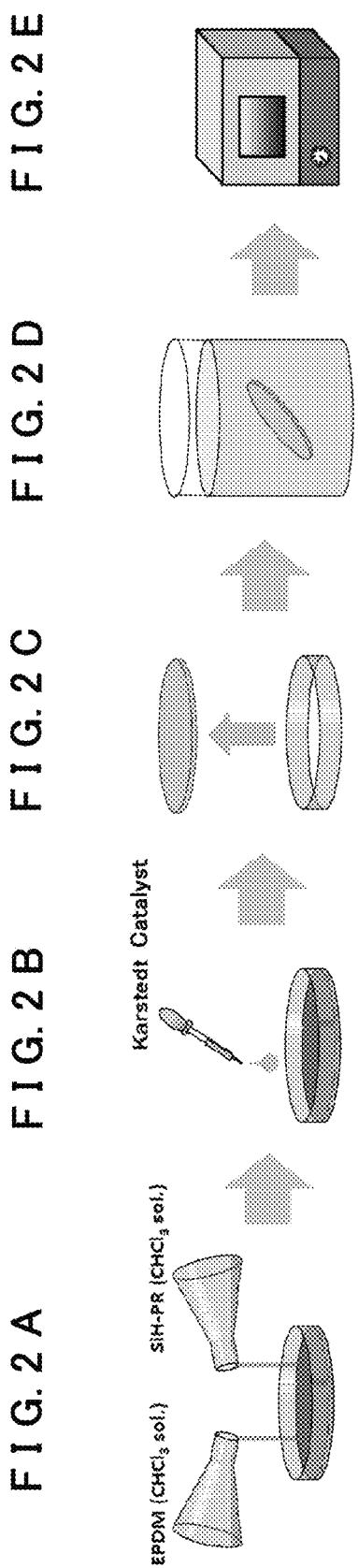

F I G. 5 A
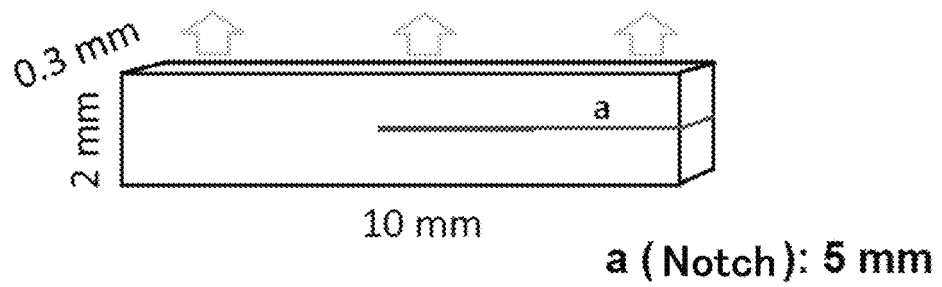
a (Notch): 5 mm
F I G. 5 B
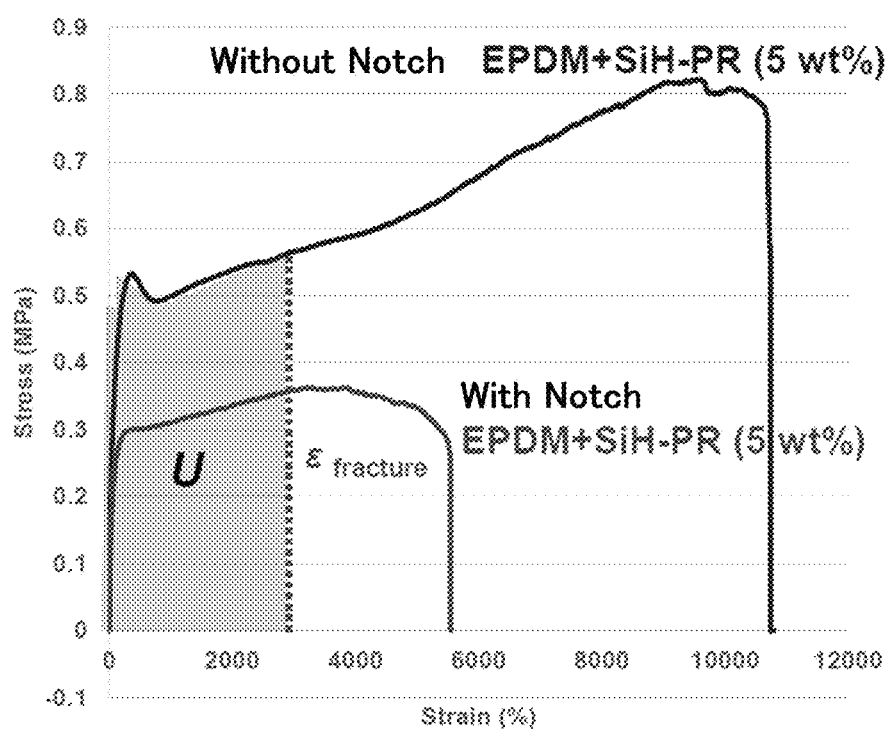

POLYROTAXANE, POLYMER COMPOSITION, CROSSLINKED POLYMER COMPOSITION, AND PRODUCTION METHOD THEREFOR

CROSS REFERENCE TO RELATED APPLICATIONS

This application is a U.S. national stage application of PCT/JP2020/044782 filed on Dec. 2, 2020, and claims priority to Japanese Patent Application No. 2020-021219 filed on Feb. 12, 2020, the disclosures of which are incorporated herein by reference.

TECHNICAL FIELD

The present invention relates to a polyrotaxane, a polymer composition containing the polyrotaxane, and a crosslinked polymer composition containing the polyrotaxane.

BACKGROUND

Although efforts have been conventionally made to improve the elongation at break of rubber, each rubber material has its own limit on improvement. For example, ethylene-propylene-diene rubber (EPDM) breaks at about 220 to 900% elongation. Thus, breakage of a rubber product causes a problem when the product is used in a field where high elongation performance is required. For example, when EPDM is transitioned to lightweight rubber having a higher foaming rate, it is more likely to break due to sticking or a similar phenomenon.

In recent years, attempts have been made to improve the physical properties of rubber by addition of a polyrotaxane to the rubber. Additional attempts have also been made to cause a polyrotaxane to function as a crosslinking agent for rubber, to thereby develop physical properties different from those of conventional crosslinked rubber. As disclosed in Patent Document 1, a polyrotaxane is a molecular assembly having a structure wherein a linear molecule slidably penetrates through a cyclic molecule, and the cyclic molecule is prevented from being removed by blocking groups disposed at both ends of the linear molecule. The polyrotaxane is also called "slide-ring material."

Patent Document 2 discloses a crosslinked rubber composition containing EPDM sulfur-crosslinked with a polyrotaxane having a vinyl group, and exhibiting desired tensile strength, tensile elongation rate, and permanent compression set.

Patent Document 3 discloses a crosslinked rubber composition containing styrene-butadiene rubber (SBR) sulfur-crosslinked with a polyrotaxane wherein the cyclic molecule has a mercapto group, and exhibiting superior durability.

PATENT DOCUMENTS

Patent Document 1: International Publication WO 2005/080469
Patent Document 2: Japanese Unexamined Patent Application Publication No. 2015-203037 (JP 2015-203037 A)
Patent Document 3: Japanese Unexamined Patent Application Publication No. 2018-24768 (JP 2018-24768 A)

SUMMARY

However, the crosslinked EPDM disclosed in Patent Document 2 exhibits a tensile elongation rate of 130 to 460%, and the crosslinked SBR disclosed in Patent Document 3 exhibits an elongation at break of 98 to 116%. Thus, none of these rubber products exhibit a significant improvement in properties over conventional rubber products.

In view of the foregoing, an object of the present invention is to provide a crosslinked polymer composition exhibiting significantly improved elongation at break over conventional ones, and to provide a polymer composition and a polyrotaxane, each of which can be used as a raw material of the crosslinked polymer composition.

[1] Polyrotaxane

A polyrotaxane containing a linear molecule, a cyclic molecule enclosing the linear molecule such that the cyclic molecule is skewered with the linear molecule, and blocking groups disposed at both ends of the linear molecule for preventing removal of the cyclic molecule, characterized in that:
the cyclic molecule has a hydrosilyl group.

In the polyrotaxane, the cyclic molecule is preferably cyclodextrin.

[2] Polymer Composition

A polymer composition containing the polyrotaxane according to [1] above or a preferred embodiment thereof, and a polymer, wherein the polymer has a double bond on at least either a main chain or a side chain.

The double bond of the polymer preferably contains a vinylidene group. Examples of the polymer include VNB-EPDM.

[3] Crosslinked Polymer Composition

A crosslinked polymer composition produced by crosslinking of the polymer composition according to [2] above or a preferred embodiment thereof, wherein the crosslinking is achieved through chemical reaction between the hydrosilyl group of the cyclic molecule and the double bond of the polymer.

[4] Method for Producing Crosslinked Polymer Composition

A method for producing a crosslinked polymer composition, the method including crosslinking the polymer composition according to [2] above or a preferred embodiment thereof in the presence of a catalyst through chemical reaction between the hydrosilyl group of the cyclic molecule and the double bond of the polymer.

Effects (A) Slide crosslinking points applicable to general-purpose rubber having a double bond can be provided by crosslinking between the SiH group of the polyrotaxane and the double bond of the polymer. In the present crosslinking system, the crosslinking can be achieved at low temperature and at high rate.

(B) An elongation of more than 1,000% can be realized by crosslinking with a double bond originally contained in general-purpose rubber.

The present invention can provide a crosslinked polymer composition exhibiting significantly improved elongation at break over conventional ones, and can provide a polymer composition and a polyrotaxane, each of which can be used as a raw material of the crosslinked polymer composition.

BRIEF DESCRIPTION OF THE DRAWINGS

FIG. 1 is a schematic view for describing modification of a hydroxypropyl-group-modified polyrotaxane into a hydrosilyl-group-modified polyrotaxane;

FIG. 2 shows a procedure for producing a crosslinked product by crosslinking reaction between EPDM and a hydrosilyl-group-modified polyrotaxane;

FIG. 5A is a perspective view of a measurement sample for determining the fracture energy of crosslinked product X-2, and FIG. 5B is a view for describing a calculation method for the fracture energy.

DETAILED DESCRIPTION

1. Polyrotaxane

Figure 3A:
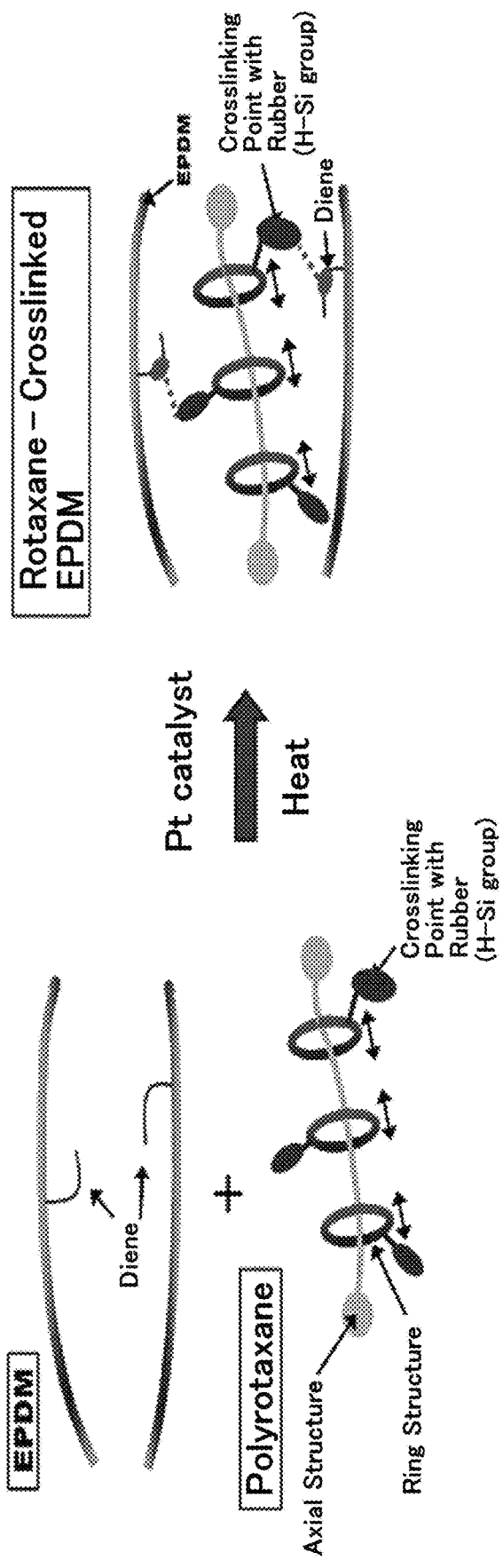
FIG. 3A shows the aforementioned crosslinking reaction in a schematic manner.

No particular limitation is imposed on the type of a polyrotaxane, so long as the cyclic molecule has a hydrosilyl group.

Examples of the cyclic molecule include cyclodextrin, crown ether, cyclophane, calixarene, cucurbituril, and cyclic amide. The cyclic molecule is preferably cyclodextrin, and particularly preferably selected from α-cyclodextrin, β-cyclodextrin, and γ-cyclodextrin. The cyclic molecule may contain cyclodextrin and another cyclic molecule.

Examples of the linear molecule include polyethylene glycol, polylactic acid, polyisoprene, polyisobutylene, polybutadiene, polypropylene glycol, polytetrahydrofuran, polydimethylsiloxane, polyethylene, polypropylene, polyvinyl alcohol, and polyvinyl methyl ether. The linear molecule is preferably polyethylene glycol, and may contain polyethylene glycol and another linear molecule.

Examples of the blocking group include dinitrophenyl group, cyclodextrin group, adamantane group, trityl group, fluorescein group, pyrene group, substituted benzene group (the substituent may be, for example, alkyl, alkyloxy, hydroxy, halogen, cyano, sulfonyl, carboxyl, amino, or phenyl; one or more substituents may be present), optionally substituted polynuclear aromatic group (the substituent may be, for example, the same as those described above; one or more substituents may be present), and steroid group. The blocking group is preferably selected from the group consisting of dinitrophenyl group, cyclodextrin group, adamantane group, trityl group, fluorescein group, and pyrene group, and is more preferably adamantane group or trityl group.

2. Polymer

No particular limitation is imposed on the type of a rubber polymer having a double bond in the molecule. Examples of the rubber polymer having a double bond on a main chain include butadiene rubber (BR), acrylonitrile-butadiene rubber (NBR), chloroprene rubber (CR), isoprene rubber (IR), and isobutylene-isoprene rubber (IIR). Examples of the rubber polymer having a double bond on a side chain include EPDM (in particular, VNB (5-vinyl-2-norbornene)-EPDM).

3. Catalyst

No particular limitation is imposed on the type of a catalyst. Examples of the catalyst include platinum catalysts (including platinum complex catalysts) and platinum group catalysts (including platinum group complex catalysts).

Examples

The present invention will next be described with reference to Examples (i.e., embodiments of the invention) and Comparative Examples in the following order. The present invention should not be construed as being limited to the Examples.

<1> Preparation of Hydroxypropyl-Group-Modified Polyrotaxane

<2> Modification into Hydrosilyl-Group-Modified Polyrotaxane

<3> Production of Crosslinked Products X-1 to X-5 and Y1 to Y4

<4> Measurement of Properties

<5> Evaluation

<1> Preparation of Hydroxypropyl-Group-Modified Polyrotaxane

Firstly, the hydroxypropyl-group-modified polyrotaxane (hereinafter may be abbreviated as "HAPR") disclosed in International Publication WO 2005/080469 (Patent Document 1) was prepared as a polyrotaxane containing cyclodextrin as a cyclic molecule, polyethylene glycol as a linear molecule, and blocking groups disposed at both ends of the linear molecule. The left side of FIG. 1 schematically shows HAPR.

<2> Modification into Hydrosilyl-Group-Modified Polyrotaxane

A two-necked flask was charged with 200 mL of chloroform (special grade reagent, available from FUJIFILM Wako Pure Chemical Corporation), 10 mL of 1,1,3,3-tetramethyldisilazane (TMDS) (available from Tokyo Chemical Industry Co., Ltd.), and 0.1 mL of 1,8-diazabicyclo[5.4.0]undec-7-ene (DBU) (available from Tokyo Chemical Industry Co., Ltd.) in this order, and the resultant mixture was stirred for five minutes.

To the mixture was added 5 g of the HAPR prepared in <1> above, and the resultant mixture was stirred at room temperature. Immediately after addition of the HAPR, the HAPR did not dissolve in the mixture and formed clumps. However, the HAPR dissolved gradually from the interface and then completely dissolved after the elapse of about one to two hours.

After initiation of the dissolution of the HAPR in chloroform, ammonia gas (i.e., by-product) is continuously generated until completion of the reaction shown in FIG. 1; i.e., the reaction is completed when generation of ammonia gas is stopped (reaction time: about three days). Thus, a hydrosilyl group (—SiH)-modified polyrotaxane (hereinafter may be abbreviated as "HAPR-SiH") shown in the right side of FIG. 1 was produced. Generation of ammonia was determined with a phenolphthalein solution (50% aqueous ethanol solution) as an indicator.

After completion of the reaction, the reaction mixture was diluted with 300 mL of chloroform, and the diluted mixture was filtered with a funnel and a PTFE membrane filter (available from Merck Millipore, pore size: 10 μm), to thereby yield a filtrate. When precipitated or dried, the HAPR-SiH cannot be redissolved due to the effect of hydrogen bonding. Thus, the HAPR-SiH was stored in the form of solution (filtrate) and used for formation of a film or production of a crosslinked product. The HAPR-SiH concentration of the solution is 2.5% by mass.

<3> Production of Crosslinked Products X-1 to X-5 and Y1 to Y4

Crosslinked products (crosslinked rubber composition films) X-1 to X-5 and Y1 to Y4, each having a formulation (unit: g) shown in Table 1 below, were produced as described below.

TABLE 1

| | | Crosslinked Product No. | | | | | | | |
|---|---|---|---|---|---|---|---|---|---|
| | | X-1 EPDM + PR1 wt % | X-2 EPDM + PR5 wt % | X-3 EPDM + PR10 wt % | X-4 EPDM | X-5 EPDM + TDMS | Y-1 NBR | Y-2 NBR + PR5 wt % | Y-3 CR | Y-4 CR + PR5 wt % |
| Rubber Polymer (g) | EPDM | 4.95 | 6.41 | 4.95 | 5 | 90 | — | — | — | — |
| | NBR | — | — | — | — | — | 5 | 6.41 | — | — |
| | CR | — | — | — | — | — | — | — | 5 | 6.41 |
| Crosslinking Material (g) | HAPR-SiH | 0.05 | 0.34 | 0.55 | — | — | — | 0.34 | — | 0.34 |
| | TMDS | — | — | — | — | 10 | — | — | — | — |
| Properties | Elastic Modulus (Mpa) | 1 | 0.6 | 0.3 | 0.8 | 1.1 | — | 1.2 | — | 1.3 |
| | Elongation at Break (%) * Value up to where no slippage of chuck occurred | * 3000 to 4000 | * 3000 to 4000 | * 3000 to 4000 | 640 | 2000 to 2500 | 100 to 800 | 2080 | 100 to 1000 | 2180 |
| | Fracture Energy (J/mm$^2$) | — | 24629 | — | — | 7617 | — | — | — | — |

(1) Firstly, as shown in FIG. 2A, a rubber polymer and crosslinking material for each crosslinked product were placed in a petri dish, and they were dissolved in chloroform (product code: 038-02601, available from FUJIFILM Wako Pure Chemical Corporation) and then stirred, to thereby prepare a homogeneous solution. Rubber polymers and crosslinking materials for the respective crosslinked products are detailed as follows.

For X-1, 4.95 g of EPDM (VNB-EPDM available from Mitsui Chemicals, Inc., solid) and 0.05 g (in terms of solid content) of the HAPR-SiH prepared in <2> above were placed in a petri dish. The proportion of the HAPR-SiH in these materials is 1% by mass.

For X-2, 6.41 g of EPDM (the same as above) and 0.34 g (in terms of solid content) of HAPR-SiH (the same as above) were placed in a petri dish. The proportion of the HAPR-SiH in these materials is 5% by mass.

For X-3, 4.95 g of EPDM (the same as above) and 0.55 g (in terms of solid content) of HAPR-SiH (the same as above) were placed in a petri dish. The proportion of the HAPR-SiH in these materials is 10% by mass.

For X-4, 5 g of EPDM (the same as above) was placed in a petri dish, and a crosslinking material was not placed therein.

For X-5, 90 g of EPDM (the same as above) and 10 g of tetramethyldisilazane (TMDS, product code: T0833, available from Tokyo Chemical Industry Co., Ltd.) were placed in a petri dish.

For Y-1, 5 g of NBR (trade name: Nipol DN003, available from Zeon Corporation) was placed in a petri dish, and a crosslinking material was not placed therein.

For Y-2, 6.41 g of NBR (the same as above) and 0.34 g (in terms of solid content) of HAPR-SiH (the same as above) were placed in a petri dish. The proportion of the HAPR-SiH in these materials is 5% by mass.

For Y-3, 5 g of CR (grade name: DCR-35, available from Denka Company Limited) was placed in a petri dish.

For Y-4, 6.41 g of CR (the same as above) and 0.34 g (in terms of solid content) of HAPR-SiH (the same as above) were placed in a petri dish.

(2) Subsequently, as shown in FIG. 2B, five droplets of Karsted catalyst (product number: 479519-5G, available from Sigma-Aldrich) serving as a platinum complex catalyst were added to a solution for each crosslinked product, and appropriately mixed with stirring.

(3) Subsequently, as shown in FIG. 2C, the solvent was volatilized at room temperature for one to two days, to thereby form a film of crosslinked product, and the film was removed. The thickness of the film is 0.3 mm.

(4) Subsequently, as shown in FIG. 2D, the film of crosslinked product was immersed in methanol for 12 hours or more, to thereby eliminate impurities.

(5) Thereafter, as shown in FIG. 2E, the film of crosslinked product was dried under vacuum at 45° C. for 24 hours or more, to thereby remove the solvent.

Figure 3B:
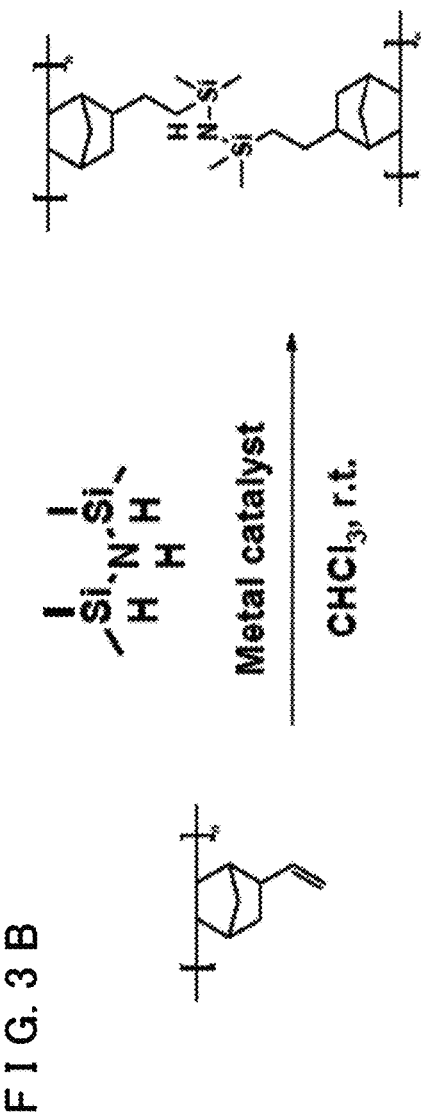
FIG. 3B shows the crosslinking reaction by a chemical scheme.

Through the aforementioned steps (2) to (3), in X-1 to X-3, the crosslinking reaction shown in FIGS. 3A and 3B occurred, and a crosslinked product was produced by chemical reaction between the hydrosilyl group of the cyclic molecule of HAPR-SiH and the double bond of EPDM. Similarly, in Y-2 or Y-4, a crosslinked product was produced by chemical reaction between the hydrosilyl group of the cyclic molecule of HAPR-SiH and the double bond of NBR or CR.

<4> Measurement of Properties (1) Measurement of Elastic Modulus and Elongation

Each of the crosslinked products was processed into a strip form (initial length: 2.8 to 6.2 mm×width: 10 mm) to thereby prepare a measurement sample. In this case, the crosslinked products have different initial lengths. However, the properties of each sample are calculated by normalizing its initial length (and area based on the initial length), and thus are probably unaffected by a difference in initial length.

Figure 4:
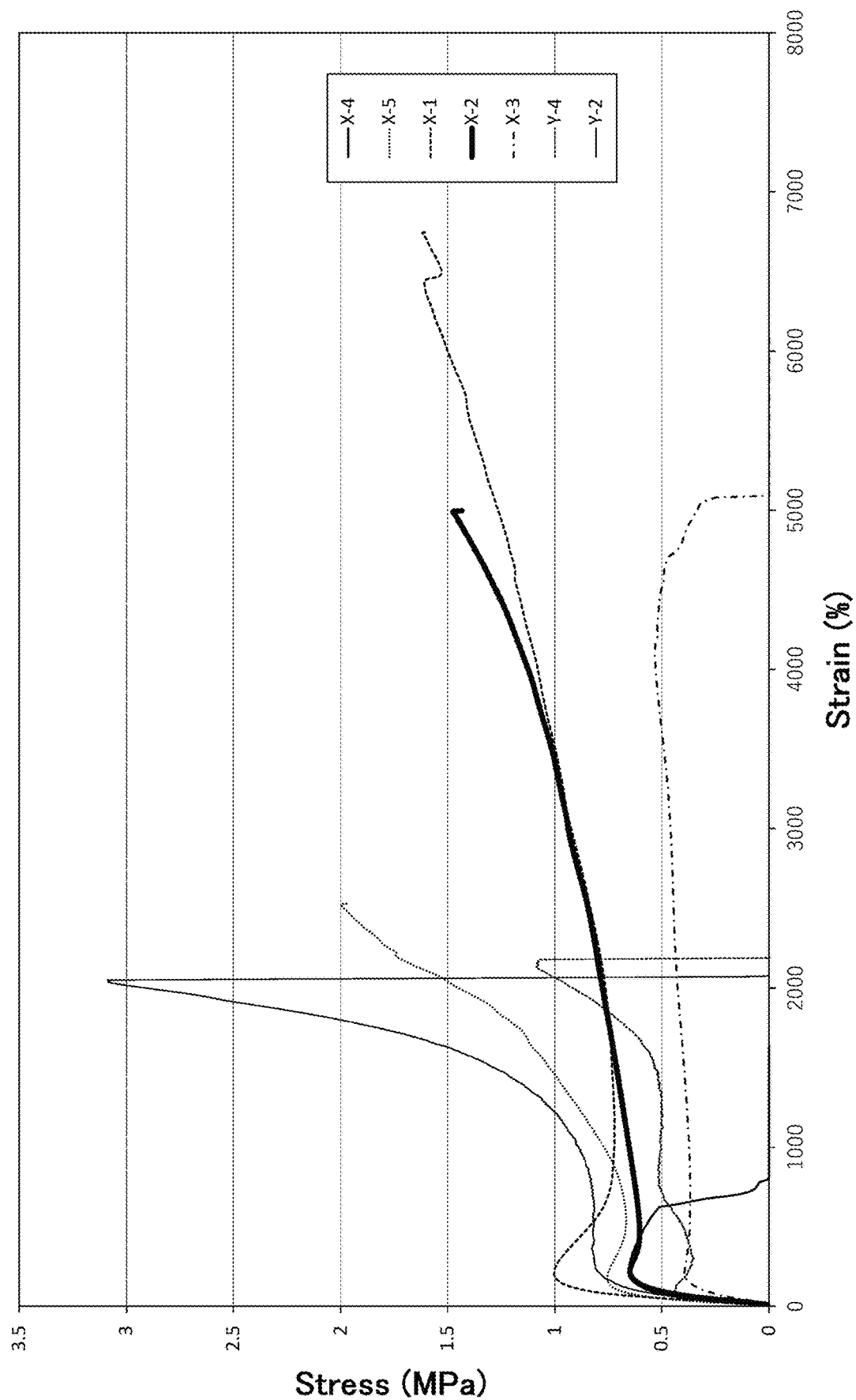
FIG. 4 is a graph showing stress-strain curves in a tensile test performed on prepared crosslinked products X-1 to X-5 and Y1 to Y4.

Each measurement sample was subjected to a tensile test with a tester "AG-X universal tester" available from SHIMADZU CORPORATION in a longitudinal direction at a tensile rate of 500 mm/min, to thereby measure a stress-strain curve. The results are shown in FIG. 4.

The elastic modulus was calculated from the slope of a linear approximation of the stress-strain curve up to 5% elongation. The results are shown in Table 1.

For crosslinked products X-1 to X-3, the elongation was defined as a value up to where no slippage of the chuck of the tester occurred, since the chuck began to slip when the crosslinked products elongated over 3,0000 (although not broken). Thus, the elongation at break of these crosslinked products was considered to be more than the value up to where no slippage of the chuck of the tester occurred. For other crosslinked products X-4, Y-1, and Y-3, the elongation at break was measured with the tester. The results are shown in Table 1.

(2) Measurement of Fracture Energy

For a crosslinked product X-2 or X-5, as shown in FIG. 5A, a slit-like notch (length: 5 mm) was provided in a strip-form measurement sample (initial length: 1.4 to 3 mmx width: 10 mm) so as to extend inward from the center of a short side, and the resultant sample was subjected to a tensile test with the aforementioned tester in a longitudinal direction at a tensile rate of 6 mm/second, to thereby measure a stress-strain curve (see the curve on the lower side of FIG. 5B for X-2) and also to measure a strain ($\varepsilon_{fracture}$) at the beginning of crack propagation from the notch of the measurement sample with a digital camera.

The fracture energy was calculated by the below-described formulae I and II from a stress-strain curve (see the curve on the upper side of FIG. 5B for X-2) measured by using the measurement sample without notch (described in (1) above). In Formulae I and II, Γ denotes a fracture energy, U denotes a stored energy until crack propagation, h denotes the initial length of a sample, and a denotes a stress (Pa). The results are shown in Table 1.

$$U = \int_0^{\varepsilon_{fracture}} \sigma(\varepsilon) d\varepsilon \quad \text{[Formula I]}$$

$$\Gamma = Uh \quad \text{[Formula II]}$$

<5> Evaluation

Crosslinked products X-4, X-5, Y-1, and Y-3 correspond to Comparative Examples.

Crosslinked products X-1 to X-3 are positioned as Examples, since they have a significantly higher elongation at break than crosslinked product X-4 and higher elongation at break and fracture energy than crosslinked product X-5.

Crosslinked product Y-2 is positioned as Example, since it has a significantly higher elongation at break than crosslinked product Y-1 and is estimated to have a higher fracture energy than crosslinked product Y-1.

Crosslinked product Y-4 is positioned as Example, since it has a significantly higher elongation at break than crosslinked product Y-3 and is estimated to have a higher fracture energy than crosslinked product Y-3.

The present invention is not limited to the aforementioned examples, and may be appropriately modified and embodied without departing from the spirit of the invention.

The invention claimed is:

1. A polyrotaxane comprising a linear molecule, a cyclic molecule enclosing the linear molecule such that the cyclic molecule is skewered with the linear molecule, and blocking groups disposed at both ends of the linear molecule for preventing removal of the cyclic molecule, characterized in that:

the cyclic molecule is a cyclodextrine molecule having a hydrosilyl group.

2. A polymer composition comprising the polyrotaxane according to claim 1, and a polymer, wherein the polymer has a double bond on at least either a main chain or a side chain.

3. The polymer composition according to claim 2, wherein the double bond of the polymer contains a vinylidene group.

4. A crosslinked polymer composition produced by crosslinking of the polymer composition according to claim 2, wherein the crosslinking is achieved through chemical reaction between the hydrosilyl group of the cyclodextrin molecule and the double bond of the polymer.

5. A method for producing a crosslinked polymer composition, the method comprising crosslinking the polymer composition according to claim 2 in the presence of a catalyst through chemical reaction between the hydrosilyl group of the cyclodextrin molecule and the double bond of the polymer.

* * * * *